(12) United States Patent
Mayberry et al.

(10) Patent No.: US 12,455,121 B2
(45) Date of Patent: Oct. 28, 2025

(54) ADDITIVELY MANUFACTURED THERMAL ENERGY STORAGE UNITS

(71) Applicant: Raytheon Company, Arlington, VA (US)

(72) Inventors: Travis L. Mayberry, McKinney, TX (US); Nicholas I. Maniscalco, Plano, TX (US); Katherine P. Carpenter, Plano, TX (US); Michael J. Arthur, Indianapolis, IN (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 17/481,741

(22) Filed: Sep. 22, 2021

(65) Prior Publication Data

US 2022/0003509 A1  Jan. 6, 2022

Related U.S. Application Data

(62) Division of application No. 16/150,351, filed on Oct. 3, 2018, now abandoned.

(51) Int. Cl.
  *F28D 20/02* (2006.01)
  *C09K 5/06* (2006.01)

(52) U.S. Cl.
  CPC ............ *F28D 20/023* (2013.01); *C09K 5/063* (2013.01); *F28D 20/021* (2013.01); *F28D 20/028* (2013.01)

(58) Field of Classification Search
  CPC ........ B33Y 10/00; B33Y 80/00; C09K 5/063; F28D 20/021; F28D 20/02; F28D 20/028
  See application file for complete search history.

(56) References Cited

U.S. PATENT DOCUMENTS

| | | |
|---|---|---|
| 7,002,800 B2 | 2/2006 | Elias et al. |
| 7,433,190 B2 | 10/2008 | Kehl et al. |

(Continued)

FOREIGN PATENT DOCUMENTS

| | | |
|---|---|---|
| CN | 106940148 | 7/2017 |
| EP | 2738803 | 6/2014 |

(Continued)

OTHER PUBLICATIONS

"U.S. Appl. No. 16/150,351, Preliminary Amendment filed Oct. 3, 2018", 6 pgs.

(Continued)

*Primary Examiner* — Gordon A Jones
(74) *Attorney, Agent, or Firm* — Schwegman Lundberg & Woessner, P.A.

(57) ABSTRACT

A method of forming a thermal energy storage unit for a surface to be cooled or heated includes using an additive manufacturing process to form a plurality of non-rectilinear structures having a plurality of thermally conductive substructures, the substructures defining a plurality of interior cavities within the substructures and a plurality of exterior fluid channels that cross over or under the plurality of interior cavities, arranging the plurality of non-rectilinear structures in a plurality of housings, wherein each of the plurality of non-rectilinear structures is arranged in a corresponding one of the plurality of housings, and connecting the plurality of housings to each other to build up the thermal energy storage unit whereby the thermal energy storage unit is modular.

23 Claims, 4 Drawing Sheets

(56) References Cited

U.S. PATENT DOCUMENTS

| | | | |
|---|---|---|---|
| 8,790,540 B2* | 7/2014 | Holloway | F28F 3/02 252/70 |
| 8,960,182 B2 | 2/2015 | Magaldi et al. | |
| 9,226,428 B2 | 12/2015 | Pidwerbecki et al. | |
| 9,612,061 B2 | 4/2017 | Rini et al. | |
| 9,841,243 B2 | 12/2017 | Oliva Llena et al. | |
| 9,873,305 B2 | 1/2018 | Bank et al. | |
| 9,913,411 B2 | 3/2018 | De Bock et al. | |
| 11,231,237 B2* | 1/2022 | Chopard | F28D 20/023 |
| 2006/0196632 A1* | 9/2006 | Kudo | F28D 20/02 165/10 |
| 2009/0236071 A1* | 9/2009 | Jensen | F28D 20/02 165/10 |
| 2012/0061065 A1 | 3/2012 | LaCombe | |
| 2012/0168111 A1* | 7/2012 | Soukhojak | F28D 15/043 165/10 |
| 2014/0251310 A1 | 9/2014 | Muren et al. | |
| 2015/0014323 A1* | 1/2015 | Loukus | F41H 7/044 428/34.1 |
| 2015/0027662 A1* | 1/2015 | Schmitz | F28D 20/02 165/67 |
| 2016/0370124 A1* | 12/2016 | Ide | C09K 5/16 |
| 2017/0023312 A1* | 1/2017 | Urbanski | F28F 3/048 |
| 2017/0356698 A1 | 12/2017 | Anderson et al. | |
| 2018/0106564 A1 | 4/2018 | Isaacs et al. | |
| 2018/0187984 A1 | 7/2018 | Manzo | |
| 2018/0328673 A1 | 11/2018 | Stoia et al. | |
| 2018/0331016 A1 | 11/2018 | Kang | |
| 2019/0024989 A1* | 1/2019 | Wilson | F28F 9/0214 |
| 2019/0285356 A1* | 9/2019 | Lassini | F28D 15/0275 |
| 2020/0109901 A1 | 4/2020 | Mayberry et al. | |
| 2020/0333088 A1* | 10/2020 | Manzo | B22F 3/1115 |
| 2021/0254903 A1* | 8/2021 | Sayma | F28D 20/02 |
| 2023/0009377 A1* | 1/2023 | Abu Al-Rub | F28F 7/02 |

FOREIGN PATENT DOCUMENTS

| | | |
|---|---|---|
| EP | 3861271 | 8/2021 |
| WO | 2017053184 | 3/2017 |
| WO | 2018130367 | 7/2018 |
| WO | 2020072719 | 4/2020 |

OTHER PUBLICATIONS

"U.S. Appl. No. 16/150,351, Restriction Requirement mailed Apr. 22, 2020", 8 pgs.

"U.S. Appl. No. 16/150,351, Response filed Jun. 3, 2020 to Restriction Requirement mailed Apr. 22, 2020", 7 pgs.

"U.S. Appl. No. 16/150,351, Non Final Office Action mailed Jun. 29, 2020", 10 pgs.

"U.S. Appl. No. 16/150,351, Examiner Interview Summary mailed Sep. 21, 2020", 3 pgs.

"U.S. Appl. No. 16/150,351, Response filed Oct. 26, 2020 to Non Final Office Action mailed Jun. 29, 2020", 13 pgs.

"U.S. Appl. No. 16/150,351, Supplemental Amendment filed Dec. 2, 2020", 12 pgs.

"U.S. Appl. No. 16/150,351, Supplemental Amendment filed Mar. 8, 2021", 12 pgs.

"U.S. Appl. No. 16/150,351, Non Final Office Action mailed Apr. 2, 2021", 13 pgs.

"U.S. Appl. No. 16/150,351, Response filed Jun. 21, 2021 to Non Final Office Action mailed Apr. 2, 2021", 11 pgs.

"U.S. Appl. No. 16/150,351, Final Office Action mailed Jun. 30, 2021", 16 pgs.

"International Application Serial No. PCT US2019 054404, International Search Report mailed Jan. 20, 2020", 4 pgs.

"International Application Serial No. PCT US2019 054404, Written Opinion mailed Jan. 20, 2020", 5 pgs.

"International Application Serial No. PCT US2019 054404, International Preliminary Report on Patentability mailed Apr. 15, 2021", 7 pgs.

"European Application Serial No. 19791065.6, Response to Communication pursuant to Rules 161(1) and 162 EPC filed Oct. 19, 2021", 10 pgs.

"European Application Serial No. 19791065.6, Response filed Mar. 23, 2022 to Intention to Grant mailed Feb. 1, 2022", 19 pgs.

\* cited by examiner

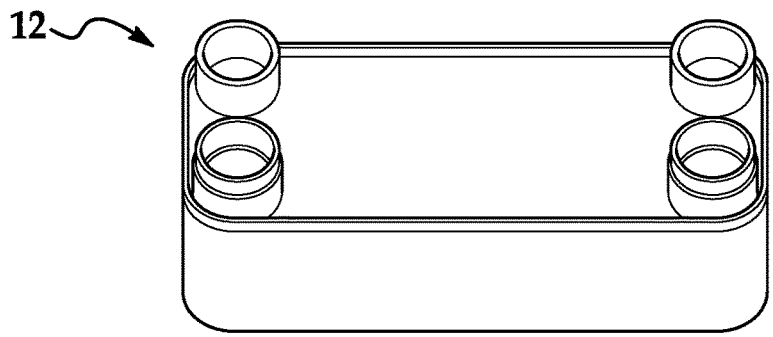
FIG. 1
PRIOR ART
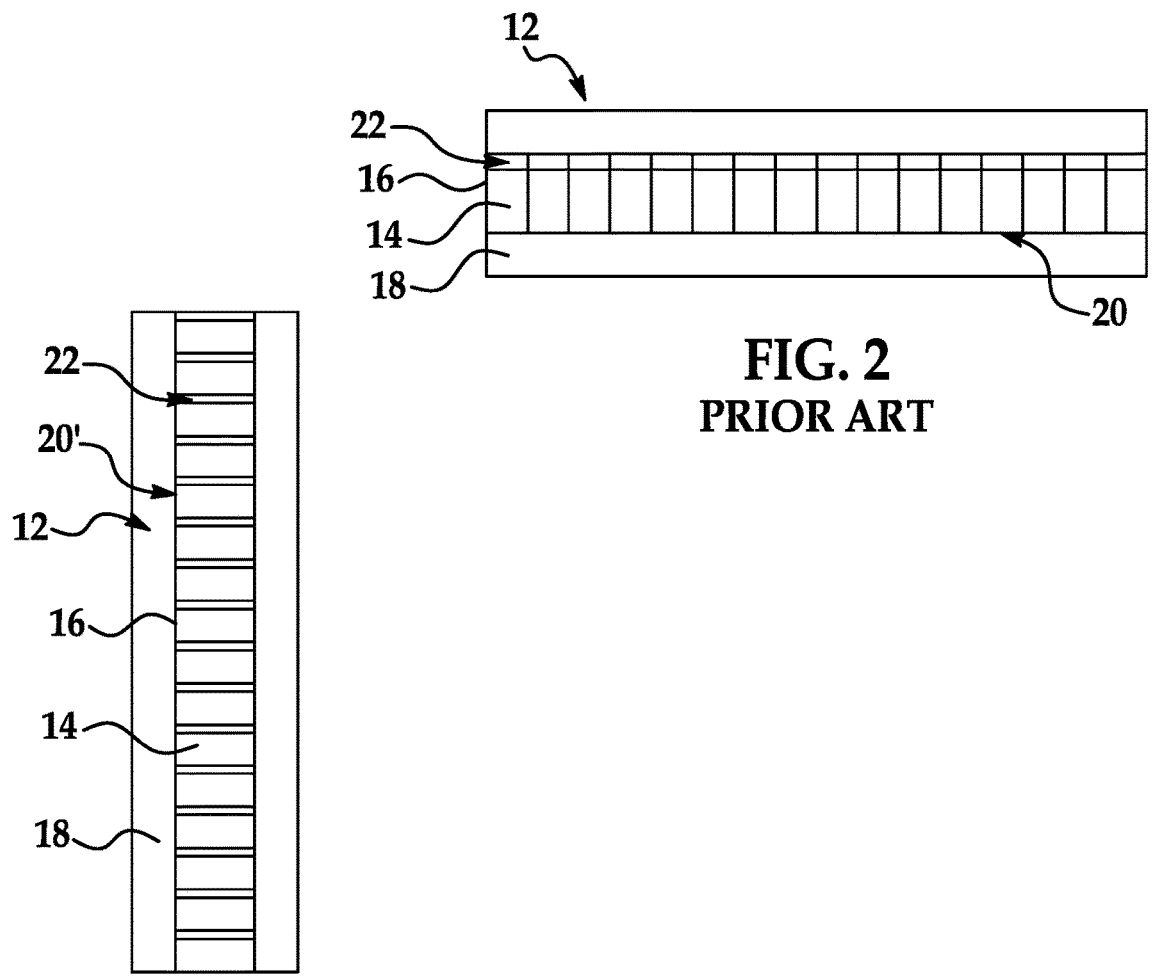
FIG. 2
PRIOR ART
FIG. 3
PRIOR ART

ADDITIVELY MANUFACTURED THERMAL ENERGY STORAGE UNITS

RELATED APPLICATIONS

This application is a divisional application of U.S. application Ser. No. 16/150,351 filed Oct. 3, 2018, which is hereby incorporated herein by reference in its entirety.

FIELD OF INVENTION

The invention relates to structures manufactured using additive manufacturing, and more particularly, to thermal energy storage units having thermally conductive structures that are formed by additive manufacturing.

DESCRIPTION OF THE RELATED ART

Thermal energy storage units may be used in a variety of applications, and particularly in applications that have electronics or other high heat-generating sources. Exemplary applications include lasers, rail guns, and various hypersonic applications. A phase change material (PCM) may be used in the thermal energy storage unit such enabling the thermal energy storage unit to effectively be used as a heat exchanger for a heat-dissipating surface. PCMs have a high latent heat of fusion such that thermal energy from high heat-dissipating applications is able to be stored as latent heat during the phase change of the PCM from a solid form, such as a wax, to a liquid form. During the phase change, the heat is stored in the PCM enabling temperature stability in the high heat-generating source.

Using PCMs for electronics thermal management is advantageous in that the thermal energy is maintained at a constant rate during a pulsed load of the electronics. Thus, heat removal occurs for an average heat load rather than only for a peak load. Using the PCMs also enables short-term thermal storage and protection from failure of the electronics during temporary failure of an associated cooling system for the electronics.

The PCM may be stored in a thermally conductive structure having enclosures that are formed by conventional manufacturing processes such as casting, brazing, or machining. Due to the manufacturing limitations of such conventional processes, the enclosures are usually rectilinear or have other fixed and simple shapes such as straight finstock. The simple shapes of the structures are disadvantageous for several reasons. For example, the structures may be unable to be accommodated in areas that are non-rectilinear, such as in a dome-shaped portion of an airborne vehicle. Another disadvantage is that the structures are gravity dependent such that if the structures are rotated to the side, as in an airborne application, the PCM will also rotate to the side which will prevent even or full melting of the PCM due to non-uniform contact between the PCM and a thermally conductive surface arranged between the PCM and a heat transfer fluid that flows along the thermally conductive surface to melt the PCM.

SUMMARY OF THE INVENTION

Using additive manufacturing (AM) enables forming a thermal energy storage unit having non-rectilinear, thermally conductive shellular structures that define hollow cavities within the shellular structures and external flow channels that enable fluid flow around the hollow cavities. A phase change material (PCM) is arranged in the external flow channels or the hollow cavities and is cross-flowed with fluid flowing through the other of the external flow channels or the hollow cavities to melt the PCM.

Using an AM method, such as 3D printing or metal laser powder bed AM, to form more complex thermally conductive structures for a thermal energy storage unit is advantageous in that the structures maximize the wetted surface area of the thermally conductive shellular structures that contacts the PCM to conduct heat into the PCM. Thus, the shellular structures are formed to be gravity independent and gravitationally agnostic ensuring even melting and full use of the PCM when the PCM is arranged in different orientations and when subject to a gravity vector in any direction, such as in an airborne or space application. Additionally, using AM enables the shellular structures to be topology optimized and conform to different shapes of the housing in which the thermal energy storage unit is contained. Still another advantage of using AM to form the shellular structures is that multiple heat exchanger housings containing AM shellular structures may be formed and connected to each other to form a modular, large-scale thermal energy storage unit.

According to an aspect of the invention, a thermal energy storage unit or heat exchanger includes a structure defining at least one flow path and at least one thermally conductive substructure that is gravity independent, gravitationally agnostic, arranged in the flow path, and contains a phase change material that is able to melt evenly and fully.

According to an aspect of the invention, a thermal energy storage unit or heat exchanger includes a plurality of thermally conductive substructures that define a plurality of interior cavities and exterior fluid channels that are intertwined, and one of either the plurality of interior cavities or the exterior fluid channels contains a phase change material.

According to an aspect of the invention, a thermal energy storage unit is arranged on a surface to be cooled or heated, and the thermal energy storage unit includes at least one housing defining at least one flow path that extends along the surface, and at least one non-rectilinear structure that is arranged in the at least one flow path and has a plurality of thermally conductive substructures. The substructures define a plurality of interior cavities within the substructures and a plurality of exterior fluid channels that cross over or under the plurality of interior cavities. One of either the plurality of exterior fluid channels or the plurality of interior cavities is configured to contain a phase change material and the other of either the plurality of exterior fluid channels or the plurality of interior cavities accommodates a heat transfer fluid that cross-flows the phase change material.

According to an embodiment of any paragraph(s) of this summary, the at least one non-rectilinear structure has a shape that is conformal to the at least one housing.

According to an embodiment of any paragraph(s) of this summary, the at least one non-rectilinear structure is shellular in shape.

According to an embodiment of any paragraph(s) of this summary, the non-rectilinear structure is a hollow lattice, and each of the plurality of substructures has a hollow interior and a plurality of openings that are fluidly connected between the hollow interior and adjacent substructures.

According to an embodiment of any paragraph(s) of this summary, each of the substructures has an exterior surface that defines the hollow interior and tapers to each of the plurality of openings.

According to an embodiment of any paragraph(s) of this summary, the exterior surface is curved and non-planar.

According to an embodiment of any paragraph(s) of this summary, the substructures are interconnected by tubular members connected between the plurality of openings.

According to an embodiment of any paragraph(s) of this summary, each of the substructures are identical in shape.

According to an embodiment of any paragraph(s) of this summary, the substructures have an ordered arrangement.

According to an embodiment of any paragraph(s) of this summary, the plurality of interior cavities are configured to contain the phase change material, and the phase change material is cross-flowed with a heat transfer fluid flowing through the plurality of exterior fluid channels.

According to an embodiment of any paragraph(s) of this summary, the thermal energy storage unit further includes a plurality of housings that each include at least one non-rectilinear structure, wherein the plurality of housings are connected to each other to form the thermal energy storage unit, whereby the thermal energy storage unit is modular.

According to another aspect of the invention, a method of forming a thermal energy storage unit for a surface to be cooled or heated includes using an additive manufacturing process to form at least one non-rectilinear structure having a plurality of thermally conductive substructures that define a plurality of interior cavities within the substructures and a plurality of exterior fluid channels that cross over or under the plurality of interior cavities, arranging the non-rectilinear structure in a housing defining at least one flow path that extends along the surface to be cooled or heated, providing a phase change material in one of either the plurality of exterior fluid channels or the plurality of interior cavities, and cross-flowing the phase change material with a heat transfer fluid.

According to an embodiment of any paragraph(s) of this summary, using the additive manufacturing process includes using a 3D printing manufacturing process.

According to an embodiment of any paragraph(s) of this summary, using the additive manufacturing process includes using a powder bed additive manufacturing process.

According to an embodiment of any paragraph(s) of this summary, the method further includes forming the at least one non-rectilinear structure to have a shape that is conformal to the housing.

According to an embodiment of any paragraph(s) of this summary, the method further includes forming each of the substructures to be identical in shape and in an ordered arrangement.

According to an embodiment of any paragraph(s) of this summary, the method further includes forming the non-rectilinear structure as a hollow lattice, and forming each of the plurality of substructures to have a hollow interior and a plurality of openings that are fluidly connected between the hollow interior and adjacent substructures.

According to an embodiment of any paragraph(s) of this summary, the method further includes forming each of the plurality of substructures to have an exterior surface that is non-planar and tapers to each of the plurality of openings.

According to an embodiment of any paragraph(s) of this summary, the method further includes arranging the phase change material in the plurality of interior cavities, and cross-flowing the phase change material with the heat transfer fluid through the external fluid channels.

According to an embodiment of any paragraph(s) of this summary, the method further includes providing a plurality of housings, forming a plurality of non-rectilinear structures that each have a plurality of thermally conductive substructures, wherein each of the plurality of non-rectilinear structures is arranged in a corresponding one of the plurality of housings, and connecting the housings to each other to form the thermal energy storage unit, wherein the thermal energy storage unit is modular To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 1 is a schematic drawing showing a perspective view of a conventional thermal energy storage unit.

FIG. 2 is a schematic drawing showing a cross-sectional view of the conventional thermal energy storage unit of FIG. 1 having finstock containing a phase change material.

FIG. 3 is a schematic drawing showing the conventional thermal energy storage unit of FIG. 2 when the airborne vehicle is oriented in a vertical direction.

DETAILED DESCRIPTION

Figure 4:
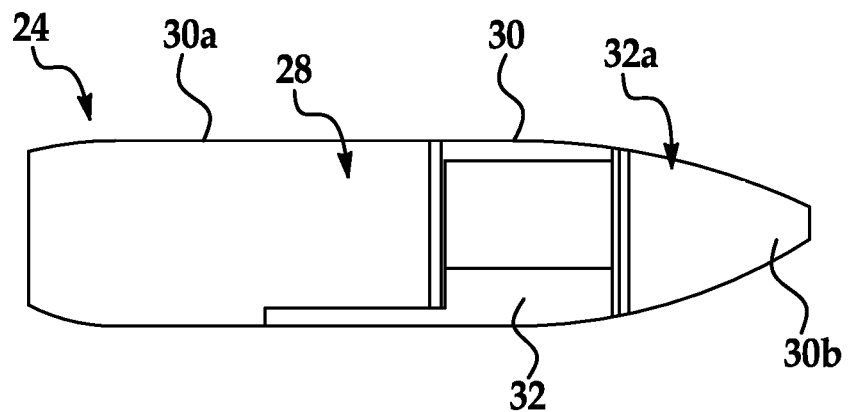
FIG. 4 is a schematic drawing showing a side cross-sectional view of an airborne vehicle having a thermal energy storage unit.

The principles described herein have particular application in thermal energy storage units or heat exchangers that are suitable for use in various applications. Examples of suitable applications include applications that use electronics requiring cooling. Exemplary applications include directed energy weapons, lasers, rail guns, hypersonic applications, and engines for short life-span components. The thermal energy storage units may be suitable for use in many other applications, such as applications using high energy duty-cycled electronics or batteries, or applications that require short-term thermal storage without using a heat sink. The thermal energy storage unit is also gravitationally agnostic such that the thermal energy storage unit is suitable for use in environments having different gravitational forces, or zero gravitational forces. Although the thermal energy storage unit is described herein as being particularly applicable for cooling a heat-dissipating surface, such as in an electronic application, the principles described herein may also be suitable for a reverse thermal application in which a cooled surface is to be heated by a heat exchanger.

Referring first to FIG. 1-3, a conventional thermal energy storage unit 12 that is rectilinear in shape is shown. The conventional thermal energy storage unit 12 contains a phase change material (PCM) and a thermal conducting surface. The thermal energy storage unit 12 may be arranged in the housing of an airborne vehicle. The conventional thermal energy storage unit 12 is formed by a conventional manufacturing process such as brazing, casting, or machining resulting in a simple shape of the unit that is polygonal and has substantially planar surfaces and linear edges as shown by the rectilinear shape of FIG. 1. The PCM is arranged for surface contact with a thermal conducting surface of an airborne vehicle that is arranged to transfer heat from the cross-flowing heat transfer fluid to the PCM for changing the phase of the PCM.

As shown in FIGS. 2 and 3, the PCM 14 is arranged in thermal conducting finstock 16 of the thermal energy storage unit 12. The thermal energy storage unit 12 also defines at least one flow path 18 that extends along the length of the finstock 16 for cross-flowing the PCM 14 with a heat transfer fluid to melt the PCM 14. The region 20 of the finstock 16 in which the heat from the cross-flowing fluid is thermally conducted to the PCM 22 through the finstock 16 may be referred to as the wetted surface area 20 of the thermal energy storage unit 12. A vacuum region or dead-volume gap 22 must also be provided to accommodate for expansion of the PCM 14 during the phase change.

The finstock 16 has a conventional shape that is rectilinear. Due to the rectilinear shape of the finstock 16, when the airborne vehicle containing the thermal energy storage unit 12 is oriented in a horizontal direction, as shown in FIG. 2, the PCM 14 will settle on the finstock 16 due to gravity. Similarly, when the airborne vehicle and thus the thermal energy storage unit 12 is oriented in a vertical direction, as shown in FIG. 3, the PCM 14 will also settle on the finstock 16 due to gravity. When the airborne vehicle and the PCM 14 are in the horizontal orientation, the wetted surface area 20 may be maximized since the dead-volume gap 22 is arranged above the PCM 14 and the wetted surface area 20 uniformly contacts the PCM 14. However, when the airborne vehicle and the PCM 14 are rotated, for example to the vertical orientation, the required dead-volume gap 22 is arranged above each layer of PCM 14 individually due to gravity. Thus, the wetted surface area 20' is at the side of the PCM 14 such that the wetted surface area 20' is disadvantageously decreased and the PCM may not evenly or fully melt.

Figure 5:
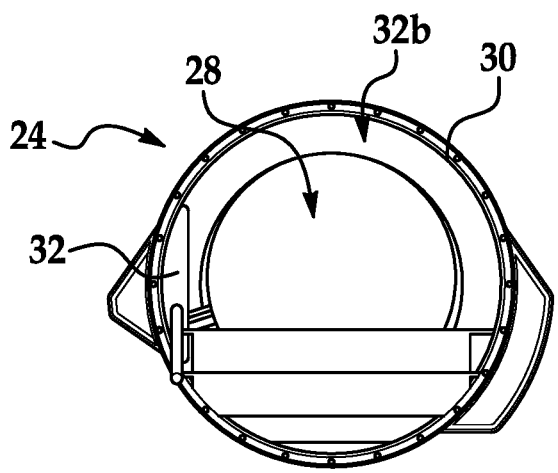
FIG. 5 is a schematic drawing showing a front cross-sectional view of the airborne vehicle of FIG. 4.

Referring now to FIGS. 4 and 5, a schematic drawing of an airborne vehicle 24 that may contain a thermal energy storage unit is shown. In an exemplary application, the airborne vehicle 24 may be a hypersonic vehicle. The airborne vehicle 24 may have a drive mechanism and at least one compartment 28 in which electronics may be contained. The airborne vehicle 24 may be autonomous. The airborne vehicle 24 may include a plurality of compartments. The airborne vehicle 24 has a housing 30 that is non-uniform in shape and has a cylindrical main body 30a that tapers toward a nose end 30b of the airborne vehicle 24.

The compartments are enclosed within the housing 30 and a phase change material (PCM) 32 may be arranged in the housing 30. Any suitable PCM may be used and the PCM is arranged in a thermal conducting thermal energy storage unit that enables the PCM 32 to be cross-flowed with a heat transfer fluid. The housing 30 contains many non-rectilinear areas 32a, 32b in which a thermal energy storage unit and a PCM could be arranged. The cross-flow melts the PCM 32 and heat is transferred from the corresponding components to be cooled, such as the electronics of the airborne vehicle 24. A suitable PCM has a high heat of fusion per unit weight, a large melting point selection, and a low thermal conductivity. Other preferable characteristics of the PCM include non-corrosivity, chemical inertness, and thermal cycle consistency. For example, a suitable PCM is in the form of a paraffin wax which is melted during the phase change of the material. The PCM may also be in the form of a fatty acid, water and/or ice, and hydrated salt.

Figure 6:
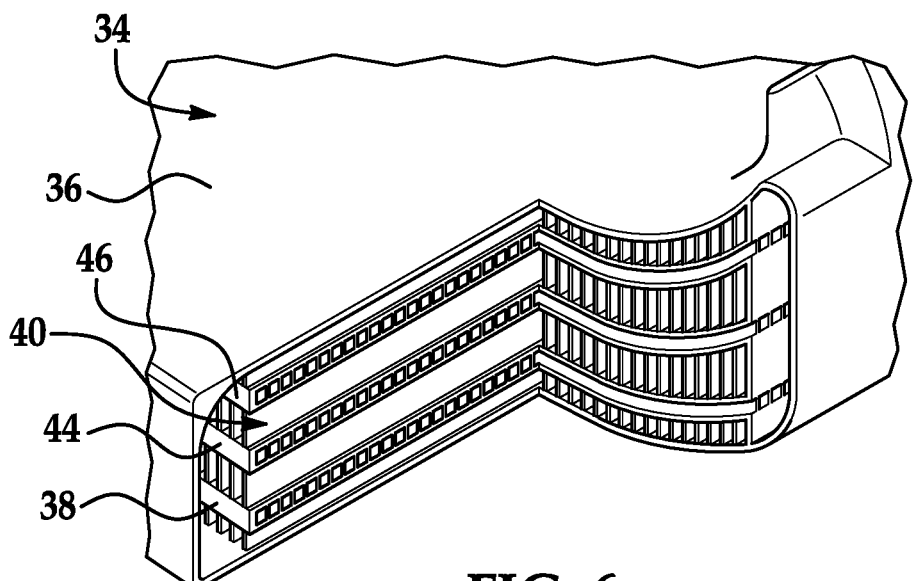
FIG. 6 is a schematic drawing showing a sectional view of a thermal energy storage unit according to an embodiment of the present invention.
Figure 7:
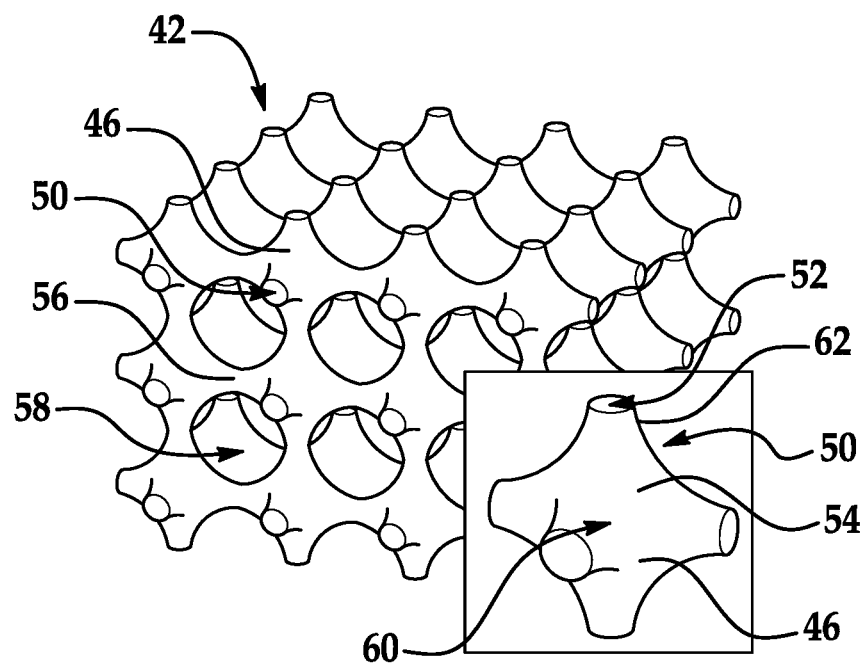
FIG. 7 is a schematic drawing showing a perspective view of an additively manufactured thermally conductive structure arranged in a flow path of the thermal energy storage unit of FIG. 6.

Referring now to FIGS. 6 and 7, a gravitationally independent thermal energy storage unit 34 according to the present application is shown. The thermal energy storage unit 34 may be in the form of a heat exchanger and is suitable for arrangement in the airborne vehicle 24 of FIGS. 4 and 5. The thermal energy storage unit 34 includes an outer housing 36 and at least one plate 38 arranged within the outer housing 36. The thermal energy storage unit 34 may include a plurality of plates that are vertically arranged and spaced in a parallel arrangement relative to each other within the outer housing 36. At least one flow path 40 is defined between the plates and the flow path 40 extends a length that is similar to the length of a surface to be cooled or heated, such as in an electronics device having a heat-dissipating surface to be cooled. Thus, cooling or heating occurs evenly along the surface. The outer housing 36 and the at least one plate 38 may be formed of any suitable material. A metal material such as aluminum may be suitable, but many other materials are also suitable. The outer housing 36 may be formed of any suitable manufacturing process such as additive manufacturing (AM) or more conventional manufacturing processes such as brazing or casting. Any suitable number of flow paths may be provided. In an exemplary embodiment, three flow paths may be provided.

The outer housing 36 of the thermal energy storage unit 34 contains at least one non-rectilinear structure 42 that is arranged in the at least one flow path 40 and formed by a suitable AM process. The non-rectilinear structure 42 is configured to contain the PCM in both solid and liquid form as will be further described below. The non-rectilinear structure 42 may be arranged to accommodate the entire volume of the at least one flow path 40 such that the non-rectilinear structure 42 extends vertically from a first plate 44 to a second plate 46. In contrast to the conventional finstock shown in FIGS. 4 and 5, using AM enables the non-rectilinear structure 42 to be formed having a more complex structure with non-planar surfaces and non-linear edges such that the non-rectilinear structure 42 is conformal to a shape of the outer housing 36 or in an application in which the outer housing 36 is contained.

The non-rectilinear structure 42 maximizes the wetted surface area for the PCM and is gravitationally independent by limiting the impact of the dead-volume gap required for expansion of the PCM. Another advantage of the non-rectilinear structure 42 is that the non-rectilinear structure 42 is configured to be gravitationally agnostic, such that a gravity vector acting on the non-rectilinear structure 42 could be in any direction, or not present at all. For example, the non-rectilinear structure 42 is suitable for use in an application in which low or zero gravity exists, such as in an aerospace application in which space or a special terrestrial flight trajectory negates the gravity vector.

The non-rectilinear structure 42 is shellular in shape and has an outer shell or exterior surface 48 that defines at least one thermally conductive substructure 50. The non-rectilinear structure 42 is formed of a plurality of substructures. The shellular shape may pertain to the non-rectilinear structure 42 having a single, continuous, smooth, interfacial shell that separates two sub-volumes that are intertwined with each other. Accordingly, each substructure 50 is hollow inside and defines an interior cavity that is a first sub-volume. In an exemplary embodiment, each substructure 50 may be interconnected with other hollow substructures to define a truss-like, lattice-type, or tubular cross structure, as shown in FIG. 7. Each substructure 50 includes at least one opening 52 that opens to the interior cavity. The substructure 50 may include a plurality of openings and each substructure 50 may include at least one curved surface 54 that tapers from a central portion of the substructure 50 to each opening 52. The opening 52 may be circular in shape, or any other shape that is suitable. Each opening 52 may be fluidly connected to another opening 52 of an adjacent substructure 50 such that all of the interior cavities are interconnected for fluid flow through the interior cavities. The openings may be connected via an enclosed tubular member 56 such that all of the interior cavities of the substructures are enclosed relative to outside the substructures. A plurality of enclosed tubular members may be provided for both connecting the substructures and providing structural support for the non-rectilinear structure 42.

Each substructure 50 may be formed to have an identical shape and the substructures may be formed in an ordered arrangement as shown in FIG. 7. Each substructure 50 is spaced from adjacent substructures to define an exterior fluid channel 58 that is external to the substructures as the second sub-volume, such that fluid is able to flow around or over each substructure 50 through the non-rectilinear structure 42 along the flow path 40 of the outer housing 36. The exterior fluid channel 58 may have any suitable shape and the non-rectilinear structure 42 may include a plurality of exterior fluid channels. As shown in FIG. 7, the substructures may define a circular exterior fluid channel 58. In other exemplary embodiments, each substructure 50 may be formed to have a different shape, size, and spacing between adjacent substructures. A non-ordered arrangement may be used to vary the conduction into the PCM. For example, each substructure 50 may be shaped to provide a gradient conduction, or gradually increase the conduction along the flow path 40 as the fluid begins to cool.

In the exemplary embodiment shown in FIG. 7, the non-rectilinear structure 42 includes four substructures and each substructure 50 is arranged such that a central portion 60 of the corresponding substructure 50 forms a corner of a square. Each substructure 50 is equidistantly spaced from adjacent substructures and all of the openings of each substructure 50 are arranged to be perpendicular or parallel with adjacent openings. In an exemplary embodiment of the substructure 50, the substructure 50 may include six openings that are equidistantly spaced from adjacent openings. Each substructure 50 may have more or less openings. Each opening may have the same size and shape. The substructure 50 may be octahedronal in shape with curved face surfaces. The substructure 50 may include eight curved and non-planar surfaces that are triangular in shape and taper from a central point of the curved surface 54 to an edge 62 of each of three openings that form corners of the curved surface. Each substructure 50 may be symmetrical in shape. In other exemplary embodiments, each substructure 50 may have more or less than eight curved surfaces and the substructure may not be symmetrical in shape.

The non-rectilinear structure 42 described herein is merely exemplary and the non-rectilinear structure 42 and the corresponding thermally conductive substructures may have any suitable geometric shapes and the shapes may be dependent on the application. For example, the shape of the non-rectilinear structure 42 may be determined using topology optimization in which a suitable software program and processor are used to determine and calculate an optimal geometry for the non-rectilinear structure 42 and the corresponding substructures based on a particular application. The optimal geometry may be determined by determining the boundaries of the application. For example, the boundaries of the housing 16 for the airborne vehicle 10 (shown in FIG. 1) could be determined and the shape of the non-rectilinear structure 42 could be formed to accommodate the space within the determined boundaries of the housing 16. As shown in FIGS. 1 and 2, the non-rectilinear structure 42 could be formed to accommodate conventionally unused areas 32a, 32b of the airborne vehicle 10 such that the non-rectilinear structure is highly integrable for different applications. Additionally, the non-rectilinear structure could be formed to accommodate other passive high thermal conductivity features, such as an oscillating heat pipe used to pull heat from the heat transfer fluid into the wax PCM.

Other geometries that may be suitable for the non-rectilinear structure 42 include other non-polygonal shapes such as circular shellular shapes, airfoil shellular shapes, pin-shaped fins, elliptical fins, helical shapes, and honeycomb tube shapes. In particular applications, the spacing between each substructure 50 may increase or decrease such that the density decreases or increases. The volume fraction of each substructure 50 may also decrease or decrease along a length of the non-rectilinear structure 42. In still another example, the non-rectilinear structure 42 may be shaped to have triangular branches that progressively increase in size from a central spine of the structure 42, such that the structure 42 has a single substructure 50 at one end and incrementally increases to have a plurality of substructures toward the opposite end. Each substructure 50 may have a different shape. Any structure that maximizes the surface area contact between the thermally conducting substructure 50 and the PCM contained within the non-rectilinear structure 42 may be used. Moreover, the non-rectilinear structure 42 may be sized up or down depending on the application.

The external fluid channels cross over and under the interior cavities such that the PCM is cross-flowed with a heat transfer fluid. The exterior fluid channels and the interior cavities may be weaved with each other to form a three-dimensional crisscross type pattern. In an exemplary embodiment, the PCM, which may be in the form of a paraffin wax, is arranged in the interior cavities such that the heat transfer fluid flows through each exterior fluid channel 58 across the PCM to melt the PCM. In another exemplary embodiment, the heat transfer fluid may flow through the interior cavities defined by the non-rectilinear structure 42 and the PCM may be arranged outside the interior cavities, but still cross-flowed with the heat transfer fluid. The non-rectilinear structure 42 having airfoil shellular shapes may be particular advantageous for an embodiment in which the PCM is arranged outside the flow paths in that the airfoil structure is shaped in the direction of the fluid flow to lower a pressure drop across the non-rectilinear structure 42 and across the corresponding flow path 40. When the PCM is arranged in either the external fluid channels or the interior cavities, the corresponding medium is provided with the required dead-volume gap for expansion of the PCM during the phase change.

Using AM to form the non-rectilinear structure 42 and substructures is advantageous in that AM enables complex and non-traditional thermally conductive structures to be formed for a thermal energy storage unit. Any suitable material for AM may be used to form the non-rectilinear structure 42 and substructures. Examples of suitable materials include metal materials such as aluminum and titanium. Other suitable materials include zinconel and nickel superalloys. Many other materials may be suitable and the selection of materials is dependent on the application. Any suitable AM manufacturing process may also be used and examples of suitable processes include 3D printing and metal laser powder bed AM.

Figure 8:
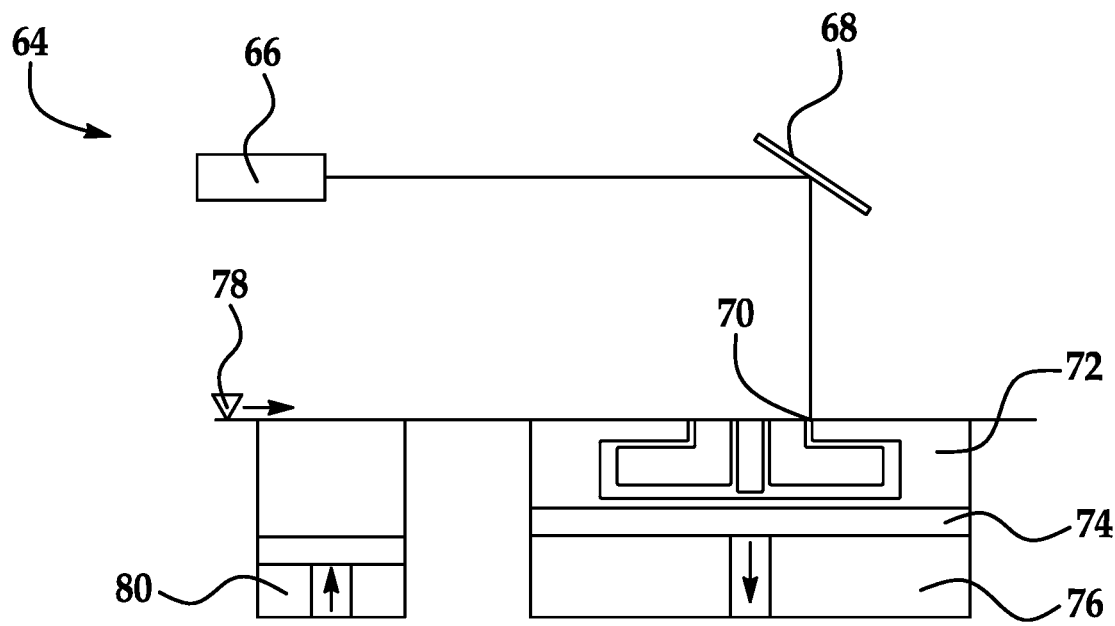
FIG. 8 is a schematic drawing showing a laser powder bed fusion process for forming the additively manufactured thermally conductive structure of FIG. 7.

With reference to FIG. 8, a schematic drawing of a suitable laser powder bed fusion process 64 is shown. The laser powder bed fusion process 64 includes using a laser or electron beam 66 and a tilted mirror 68 that directs the beam at a an object 70 which is arranged in a powder bed 72. The powder bed 72 is arranged on a platform and retractable table 74 which is arranged above a space 76 for spreading the powder material over previous layers and building up the thermally conductive substructures and the non-rectilinear structure 42. A roller or blade 78 is used for spreading the powder material and a hopper or reservoir and a powder delivery system 80 is provided to supply fresh material for the blade 78.

Figure 9:
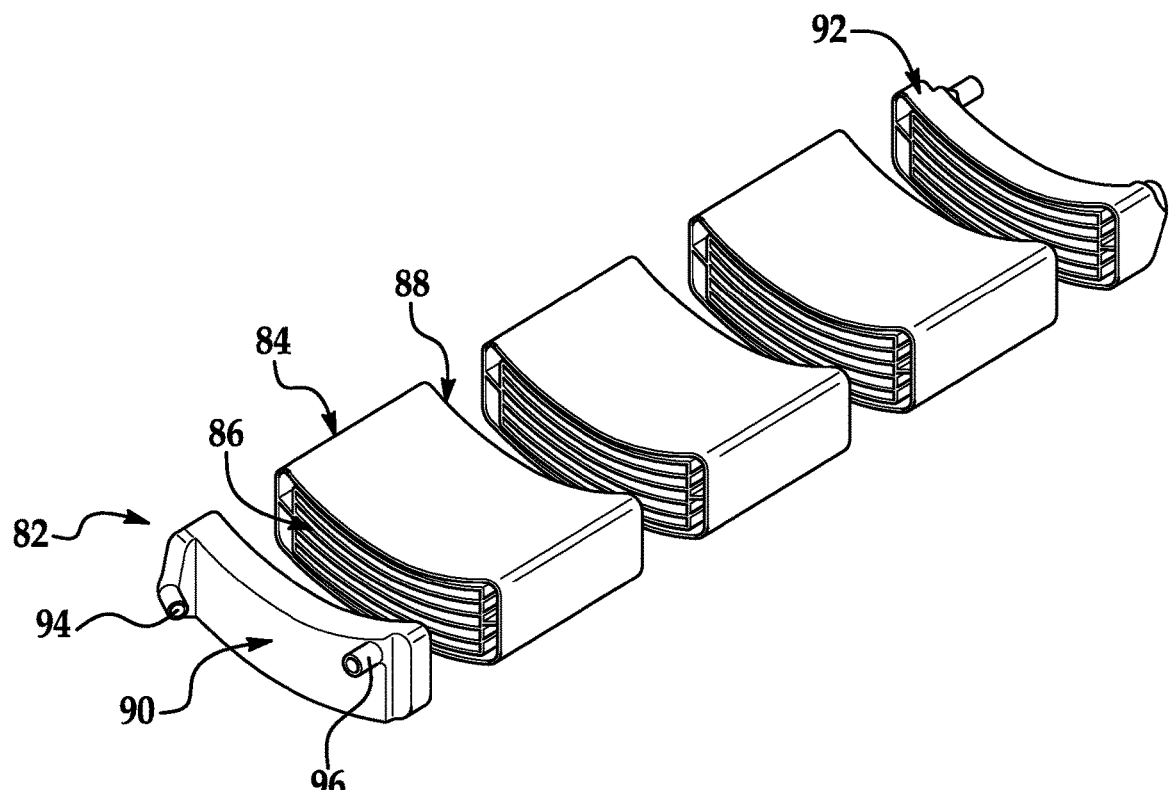
FIG. 9 is a schematic drawing showing a perspective view of a modular, large-scale thermal energy storage unit according to another embodiment of the present invention.

Using AM to form a thermal energy storage unit is further advantageous in forming a modular, large-scale thermal energy storage unit 82 as shown in FIG. 9. Using AM enables the thermal energy storage unit 82 to have more than one heat transfer section 84 and an associated core 86 of the section 84 that contains a suitable non-rectilinear structure 42 having the thermally conductive substructures and PCM as previously described. Each core 86 of the section 84 may include a non-rectilinear structure 42 having thermally conductive substructures with shapes that are the same or different relative to the other sections. The sections may each be formed or built-up separately and then connected to each other using any suitable process. The sections may be linked together using AM or more conventional manufacturing processes such as welding or bonding. The sections may also be sealed to each other at the interface 88 between two adjacent sections to retain heat within the thermal energy storage unit 82. Any suitable sealing material may be used such as gasket seals and other similar sealing materials.

Forming the large-scale thermal energy storage unit 82 is advantageous in that the total size of the unit may be larger than a build volume of an individual 3D printer used to form the core 86 of each section 84. Moreover, forming the large-scale thermal energy storage unit 82 to have modular sections reduces the risk of the entire unit failing due to the failure of only one section 84. The large-scale thermal energy storage 82 may have end sections 90, 92 and any suitable number of sections interposed between the end sections 90, 92. As shown in FIG. 9, three sections that each contain a core 86 are arranged between the end sections 90, 92. However, less than three sections or more than three sections may be provided. Accordingly, the large-scale thermal energy storage unit 82 may be sized up or down depending on the application. Additionally, the thermal energy storage unit 82 may be suitable for integrating with other functional features such as manifolding and fittings of a system in which the thermal energy storage unit 82 may be arranged. The thermal energy storage unit 82 includes fluid inlets and outlets 94, 96 for fluid flow through the thermal energy storage unit 82.

Figure 10:
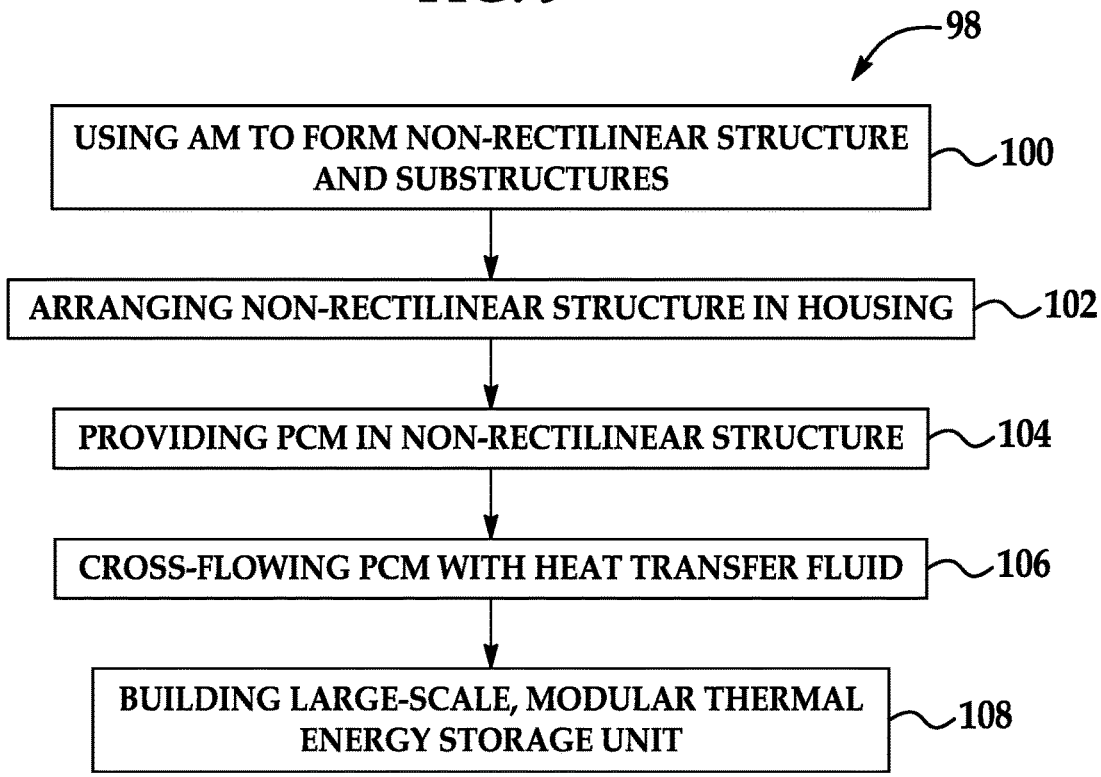
FIG. 10 is a schematic drawing showing a method of forming a thermal energy storage unit according to an embodiment of the present invention.

Referring now to FIG. 10, a method 98 of forming a thermal energy storage unit is schematically shown in a flowchart. The first step 100 of the method 98 includes using an AM process to form the non-rectilinear structure 42 having a plurality of thermally conductive substructures 50 that define a plurality of interior cavities and a plurality of exterior fluid channels that cross over or under the plurality of interior cavities (as shown in FIG. 7). Step 100 may include using 3D printing or laser powder bed fusion, or forming each of the substructures 50 to be identical in shape and in an ordered arrangement. Step 100 may include forming the non-rectilinear structure 42 as a hollow lattice, and forming each of the plurality of substructures 50 to have a hollow interior and a plurality of openings that are fluidly connected between the hollow interior and adjacent substructures. Step 100 may include forming each of the plurality of substructures 50 to have an exterior surface that is non-planar and tapers to each of the plurality of openings. Step 102 includes arranging the non-rectilinear structure 42 in the housing 36 defining at least one flow path that extends along the surface to be cooled or heated (as shown in FIG. 6). Step 102 may further include forming the non-rectilinear structure 42 to have a shape that is conformal to the housing 36.

Step 104 of the method 98 includes providing the PCM in one of either the plurality of exterior fluid channels or the plurality of interior cavities of the non-rectilinear structure 42. Step 106 includes cross-flowing the PCM with a heat transfer fluid. Step 104 may include arranging the PCM in the plurality of interior cavities and step 106 may include cross-flowing the PCM with the heat transfer fluid through the external fluid channels. Step 108 includes building the large-scale, modular thermal energy storage unit 82 (as shown in FIG. 9). Step 108 may include providing a plurality of housings, forming a plurality of non-rectilinear structures that each have a plurality of thermally conductive substructures, and connecting the housings to each other to form the thermal energy storage unit 82.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of forming a thermal energy storage unit for a surface to be cooled or heated, the method comprising:
   forming a plurality of cores configured to be gravitationally agnostic, each of the plurality of cores is formed of non-rectilinear structures having a plurality of thermally conductive substructures using an additive manufacturing process, the plurality of thermally conductive substructures defining a plurality of interior cavities within each of the thermally conductive substructures and a plurality of exterior fluid channels that cross over or under the plurality of interior cavities;

fluidly connecting one or more of the plurality of interior cavities of adjacent thermally conductive substructures; wherein fluidly connecting one or more of the plurality of interior cavities of at least two adjacent thermally conductive substructures of the plurality of thermally conductive substructures forms the plurality of exterior fluid channels;

additively forming a plurality of outer housings, each outer housing of the plurality of outer housings including at least one curved surface, wherein the at least one curved surface is conformal to the surface to be cooled or heated;

inserting the plurality of cores in at least one outer housing of the plurality of outer housings, wherein each of the plurality of cores is arranged in a corresponding outer housing one of the plurality of outer housings; wherein the at least one outer housing is configured to encase one or more cores of the plurality of cores; and connecting each outer housing of the plurality of outer housings to another outer housing to build up the thermal energy storage unit as a modular unit.

2. The method according to claim 1 further comprising forming a corresponding one of the plurality of cores to have a shape that is conformal to a shape of the corresponding one of the plurality of outer housings.

3. The method according to claim 1 further comprising forming the at least one curved surface to be conformal to the surface to be cooled or heated in an airborne vehicle that is subject to gravity, wherein the non-rectilinear structures are shaped to be gravity independent and gravitationally agnostic.

4. The method according to claim 1 further comprising forming the at least one curved surface to have a convex curvature that extends between parallel sides of at least one of the plurality of outer housings.

5. The method according to claim 1, wherein connecting the plurality of outer housings includes engaging the plurality of outer housings in a direction of fluid flow through the thermal energy storage unit, wherein the plurality of outer housings are arranged one-by-one in the direction of fluid flow.

6. The method according to claim 1, wherein connecting the plurality of outer housings to each other includes engaging interfaces of the plurality of outer housings that are adjacent to each other.

7. The method according to claim 6 further comprising forming the interfaces to extend around an outer periphery of the corresponding one of the plurality of outer housings.

8. The method according to claim 7 further comprising forming the interfaces to extend around a corresponding one of the non-rectilinear structures arranged in the corresponding one of the plurality of outer housings whereby the corresponding one of the plurality of cores is exposed to outside the corresponding one of the plurality of outer housings.

9. The method according to claim 6, wherein engaging the interfaces includes forming a sealed engagement between the interfaces.

10. The method according to claim 6 further comprising:
forming each outer housing of the plurality of outer housings to have two interfaces arranged on opposing sides; and
forming the two interfaces to be complementary in shape.

11. The method according to claim 1 further comprising:
forming two end sections that each have a fluid inlet and a fluid outlet; and
connecting the plurality of outer housings between the two end sections.

12. The method according to claim 1 further comprising:
forming each outer housing of the plurality of outer housings to have a top surface, a bottom surface, and opposite sidewalls that extend between the bottom surface and the top surface, each outer housing of the plurality of outer housings defining a flow path that runs parallel with the opposite sidewalls; and
arranging a corresponding one of the non-rectilinear structures to extend from the bottom surface to the top surface.

13. The method according to claim 12 further comprising forming each outer housing of the plurality of outer housings to have curved and non-planar edges that transition between the top surface and the opposite sidewalls, and between the opposite sidewalls and the bottom surface.

14. The method according to claim 12 further comprising forming each outer housing of the plurality of outer housings to have opposite open sides that expose a corresponding one of the plurality of cores to outside a corresponding one of the plurality of outer housings, the opposite open sides extending between the opposite sidewalls and between the top surface and the bottom surface.

15. The method according to claim 12 further comprising:
forming two end sections that each have a fluid inlet and a fluid outlet;
connecting a first one of the plurality of outer housings to a first one of the two end sections, wherein one of the fluid inlet and the fluid outlet of the first one of the two end sections is arranged proximate the top surface of the first one of the plurality of outer housings and an opposite one of the fluid inlet and fluid outlet of the first one of the two end sections is arranged proximate the bottom surface of the first one of the plurality of outer housings; and
connecting a second one of the plurality of outer housings to a second one of the two end sections, wherein one of the fluid inlet and the fluid outlet of the second one of the two end sections is arranged proximate the top surface of the second one of the plurality of outer housings and an opposite one of the fluid inlet and fluid outlet of the second one of the two end sections is arranged proximate the bottom surface of the second one of the plurality of outer housings.

16. The method according to claim 1, wherein using the additive manufacturing process to form a plurality of non-rectilinear structures includes using a 3D printer, wherein a build volume of the 3D printer used to form the plurality of non-rectilinear structures is smaller than a total size of the thermal energy storage unit.

17. The method according to claim 1 further comprising forming the plurality of outer housings to be identical in shape and size.

18. The method according to claim 1 further comprising arranging a phase change material in one of either the plurality of exterior fluid channels or the plurality of interior cavities.

19. The method according to claim 1, further comprising forming each of the plurality of outer housings to have a second curved surface using the additive manufacturing process, wherein the second curved surface is located opposite of the at least one curved surface.

20. The method according to claim 19, further comprising forming the second curved surface to have a concave curvature that extends between parallel sides of the corresponding one of the plurality of outer housings.

21. The method of claim 1, wherein a flow path that runs through the plurality of outer housings, is parallel to the at least one curved surface.

22. The method of claim 1, wherein the at least one curved surface running from one end of the outer housing to an opposite end of the outer housing.

23. A method of forming a thermal energy storage unit for a surface to be cooled or heated, the method comprising:
- forming with an additive manufacturing process a plurality of cores, each core includes a shellular non-rectilinear structure;
  - wherein the shellular non-rectilinear structure includes a plurality of thermally conductive substructures defining a plurality of interior cavities within the plurality of thermally conductive substructures;
  - wherein at least one thermally conductive substructure is gravitationally agnostic;
- forming the plurality of thermally conductive substructures to include plurality of exterior fluid channels that cross over or under the each of the at least one of thermally conductive substructure;
- fluidly connecting one or more of the plurality of interior cavities of adjacent thermally conductive substructures;
- additively forming a plurality of outer housings, each of the plurality of outer housings including at least one plate arranged within the outer housing, and at the outer housing including least one curved surface, wherein the at least one curved surface is conformal to the surface to be cooled or heated; and
- inserting the plurality of cores in at least one of each of the plurality of outer housings;
  - wherein each of the plurality of cores is arranged in and encased by a corresponding one of the plurality of outer housings.

\* \* \* \* \*